A. C. ARNOLD & E. BLACKMAN.
Assignors by mesne assignments to the said E. BLACKMAN.
LAMP.
No. 7,502.
Reissued Feb. 13, 1877.
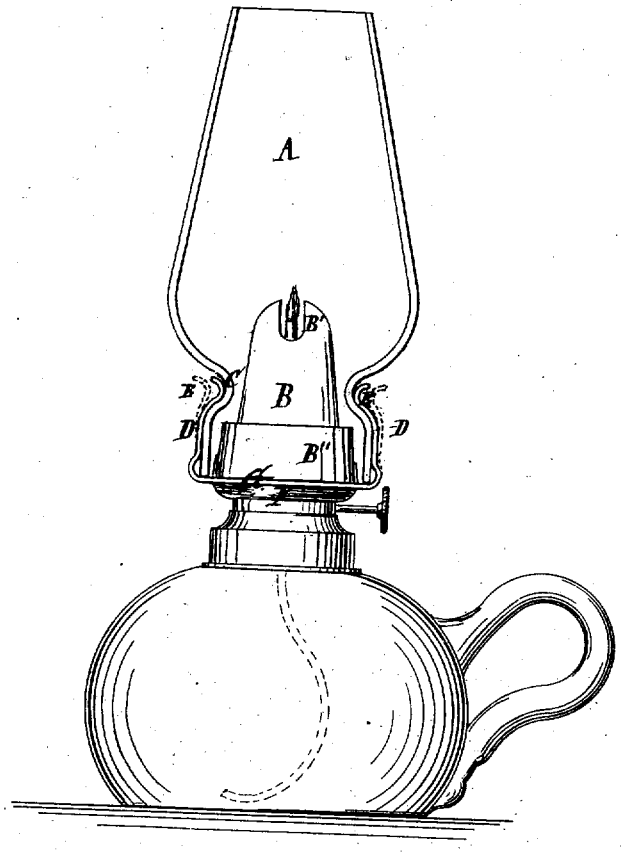
Witnesses:
Ernst Bilhuber.
Edward Breslauer.
Inventors.
E. Ebenezer Blackman
1st Alonzo C Arnold.
Per S. T. McDougall, Atty.
N. PETERS, PHOTO-LITHOGRAPHER, WASHINGTON, D. C.

UNITED STATES PATENT OFFICE.

ALONZO C. ARNOLD AND EBENEZER BLACKMAN, OF NORWALK, CONN., ASSIGNORS, BY MESNE ASSIGNMENTS, TO THE SAID EBENEZER BLACKMAN.

IMPROVEMENT IN LAMPS.

Specification forming part of Letters Patent No. 74,271, dated February 11, 1868; reissue No. 7,502, dated February 13, 1877; application filed January 12, 1877.

*To all whom it may concern:*

Be it known that we, ALONZO C. ARNOLD and EBENEZER BLACKMAN, both of the town of Norwalk, county of Fairfield and State of Connecticut, have invented a new and useful Improvement in the Mode of Constructing Lamp Glasses and Cones, and the arrangements for attaching the same to lamps; and we do hereby declare that the following is a full and correct description thereof, reference being had to the accompanying drawings, and to the letters of reference marked thereon.

The nature of our invention consists in an improved shape of the glass chimney and cone, and the arrangement for attaching the same to the lamp.

To enable others skilled in the art to make and use our invention we will proceed to describe the same.

The figure is a view of a lamp with the glass chimney placed on the same, and the arrangement for attaching to the top springs, &c.

A is a section of the glass chimney, which we make to rise up vertically from the bottom or base part about one inch more or less, and then form an indentation, C, or neck, to receive the ends of the four vertical springs D, which are made with a curved catch at the upper end E to correspond, and pass into the indentation C to hold on the glass chimney A, and the tension of the springs and catch E is regulated to the necessary strength required to prevent the chimney from toppling over when the lamp is held in an extremely inclined position; also so regulated that the chimney can be easily removed and replaced. The vertical springs D, being three or more in number, and made curved at or near the upper end E, will press into the indentations, and hold the chimney or globe securely in an upright position. The springs rising up vertically from the bottom or base, and being curved inward near their tops, which, being the point of contact with the base of the chimney or globe, the effect is to make a downward pressure on the chimney or globe, and prevent it from rising up out of the springs when being jarred or roughly used.

The metallic device F, to support the chimney or globe, we make with the usual screw for attaching, and the mode of raising and lowering the wick is the same as other lamps. The part to receive the glass and cone, we make flat at G, but sunk down within the circumference of the cone B for ventilating-perforations. The springs D are attached to the part F, rising up perpendicularly from the same, and having an inward curve near their tops, as shown at E. The perforations are mostly within the circle of the cone B, so that the air for combustion passes within the same directly to the base of the flame, and by that means is more fully consumed, and makes it less liable to smoke, and by the air passing within the cone it keeps it cool, and also the base of the glass is but slightly affected by the heat of the flame.

We are aware that Argand burners, both for gas and oil, have been made with yielding metal in the form of leaves or clipped metal; this we do not claim.

The cone B is constructed of metal and rises vertically about three-quarters of an inch more or less from the base-plate F or the metallic device F, that supports the chimney, and then runs inward at right angles or nearly so about a quarter of an inch more or less, and then rises tapering to the top of the cone, which is slotted, as shown at B, thus forming a round-topped tapering cone with a square shoulder near the center, with an air-chamber in the bottom of the cone, as shown at B″. The object of this form of cone is to prevent the lamp heating, and also to direct the air to the base of the flame, which makes it less liable to smoke, and the combustion is much more perfect.

The utility of our improvement is in the facility of removing and replacing the chimney, and the light is thrown downward without obstruction; also, the cone and base of the glass remain all the time comparatively cool.

What we claim as our invention, and desire to secure by Letters Patent, is—

1. The glass chimney A, formed as herein described, in combination with the arrangements of the vertical springs D, perforated base F, and cone B, in the manner substantially as and for the purpose herein set forth.

2. The vertical springs D, formed as described, in combination with a flat-wick lamp-burner, substantially as and for the purpose herein set forth.

3. The cone B, formed as herein described, in combination with a flat-wick lamp-burner, substantially as and for the purpose herein set forth.

ALONZO C. ARNOLD.
EBENEZER BLACKMAN.

Witnesses as to A. C. ARNOLD:
WM. R. SMITH,
GOOLD HOYT.

Witnesses as to E. BLACKMAN:
A. B. VAN WAGNER,
S. T. MCDOUGAL.